(12) United States Patent
Liu

(10) Patent No.: US 12,225,372 B2
(45) Date of Patent: Feb. 11, 2025

(54) AUDIO VISUALIZATION METHOD AND SYSTEM THEREOF

(71) Applicant: ASUSTEK COMPUTER INC., Taipei (TW)

(72) Inventor: Jung-Cheng Liu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 298 days.

(21) Appl. No.: 17/961,378

(22) Filed: Oct. 6, 2022

(65) Prior Publication Data

US 2023/0283981 A1 Sep. 7, 2023

(30) Foreign Application Priority Data

Mar. 7, 2022 (TW) ................... 111108207

(51) Int. Cl.
| | |
|---|---|
| *H04S 7/00* | (2006.01) |
| *A63F 13/533* | (2014.01) |
| *A63F 13/54* | (2014.01) |
| *G06T 15/00* | (2011.01) |
| *H04S 1/00* | (2006.01) |
| *H04S 3/00* | (2006.01) |

(52) U.S. Cl.
CPC ............. *H04S 7/40* (2013.01); *A63F 13/533* (2014.09); *A63F 13/54* (2014.09); *G06T 15/00* (2013.01); *H04S 1/007* (2013.01); *H04S 3/008* (2013.01); *H04S 7/30* (2013.01); *A63F 2300/308* (2013.01); *A63F 2300/6081* (2013.01); *H04S 2400/01* (2013.01); *H04S 2400/11* (2013.01)

(58) Field of Classification Search
CPC . H04S 7/40; H04S 1/007; H04S 3/008; H04S 7/30; A63F 13/533; A63F 13/54; G06T 15/00
See application file for complete search history.

(56) References Cited

U.S. PATENT DOCUMENTS

| | | |
|---|---|---|
| 2006/0291666 A1 | 12/2006 | Ball et al. |
| 2010/0235285 A1 | 9/2010 | Hoffberg |
| (Continued) | | |

FOREIGN PATENT DOCUMENTS

| | | |
|---|---|---|
| CN | 101241735 A | 8/2008 |
| CN | 101241785 A | 8/2008 |
| (Continued) | | |

*Primary Examiner* — Rasha S Al Aubaidi
(74) *Attorney, Agent, or Firm* — Muncy, Geissler, Olds & Lowe, P.C.

(57) ABSTRACT

An audio visualization method applied to an electronic device with a screen and a function of a silent mode is provided. The audio visualization method includes: determining whether the electronic device executes an audio/video program or not, where when the audio/video program is executed, an audio effect signal is generated; converting the audio effect signal into a two-channel signal and a multi-channel signal when the electronic device executes the audio/video program, where a channel count of the two-channel signal is less than that of the multi-channel signal; generating sound data according to the multi-channel signal when the electronic device is set to the silent mode; and generating an icon according to the sound data and presenting the icon on the screen. The disclosure also provides an audio visualization system.

10 Claims, 5 Drawing Sheets

(56) References Cited

U.S. PATENT DOCUMENTS

2011/0109732 A1* 5/2011 Ota .................... H04N 21/4122
 348/42
2016/0299738 A1* 10/2016 Mäkinen ............. G06F 3/04883

FOREIGN PATENT DOCUMENTS

| CN | 107890673 A | 4/2018 |
|----|-------------|--------|
| CN | 107992281 A | 5/2018 |
| TW | 200407027 A | 5/2004 |

* cited by examiner

AUDIO VISUALIZATION METHOD AND SYSTEM THEREOF

CROSS-REFERENCE TO RELATED APPLICATION

This application claims the priority benefit of Taiwan application serial No. 111108207, filed on Mar. 7, 2022. The entirety of the above-mentioned patent application is hereby incorporated by reference herein and made a part of the specification.

BACKGROUND OF THE INVENTION

Field of the Invention

The disclosure relates to an audio visualization method and system thereof.

Description of the Related Art

Audio effects are an important part of user experience of mobile games. However, due to use space and surroundings, it is often necessary to switch a mobile phone to a silent mode during use to avoid disturbing others. However, in the silent mode, it becomes difficult to operate some games such as shooting games that need to guide a user through audio effects to play, affecting the game experience of the user.

BRIEF SUMMARY OF THE INVENTION

The disclosure provides an audio visualization method, applied to an electronic device with a screen and a function of a silent mode. The audio visualization method includes: determining whether the electronic device executes an audio/video program or not, where when the audio/video program is executed, an audio effect signal is generated; converting the audio effect signal into a two-channel signal and a multi-channel signal when the electronic device executes the audio/video program, where a channel count of the two-channel signal is less than that of the multi-channel signal; generating sound data according to the multi-channel signal when the electronic device is set to the silent mode; and generating an icon according to the sound data and presenting the icon on the screen.

The disclosure provides an audio visualization system, applied to an electronic device with a function of a silent mode. The system includes a screen, a processing unit, an audio conversion unit, an audio analysis unit, and an icon generation unit. The processing unit is configured to execute an audio/video program, where when the audio/video program is executed, an audio effect signal is generated. The audio conversion unit is configured to receive the audio effect signal and convert the audio effect signal into a two-channel signal and a multi-channel signal, where a channel count of the two-channel signal is less than that of the multi-channel signal. The audio analysis unit is configured to, when the electronic device is set to the silent mode, receive the multi-channel signal and generate sound data according to the multi-channel signal. The icon generation unit is configured to generate an icon according to the sound data and present the icon on the screen.

Through the audio visualization method and system thereof provided in the disclosure, in a silent mode, an audio effect signal generated when an audio/video program execution is executed is converted into a multi-channel signal, and an icon is then generated by using the multi-channel signal and is presented on a screen, to provide a user with visual guidance to help the user operate.

DETAILED DESCRIPTION OF THE EMBODIMENTS

Figure 1:
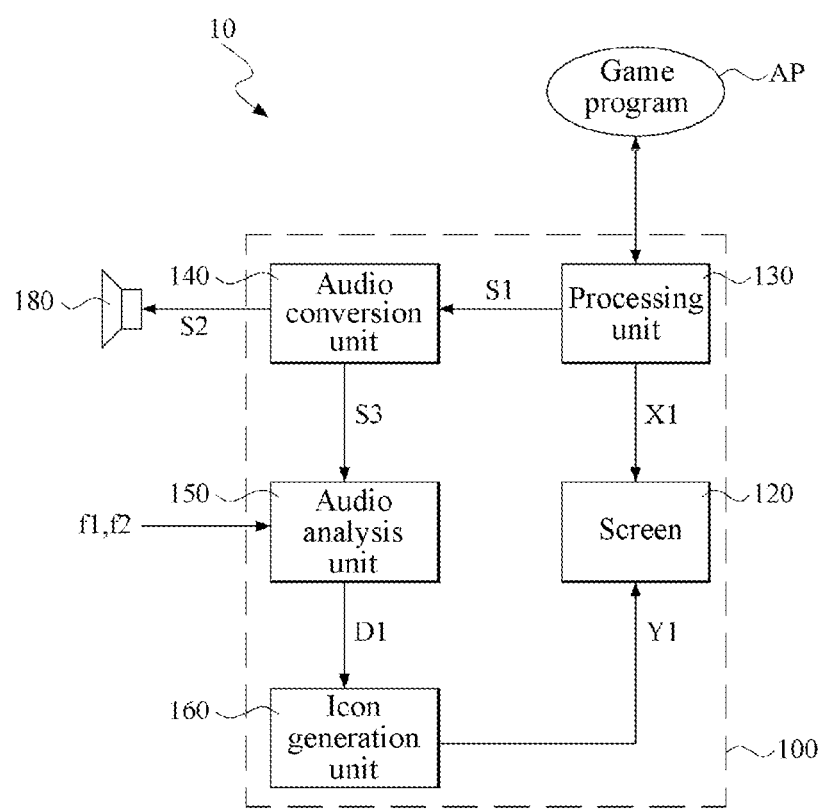
FIG. 1 is a schematic block diagram of an audio visualization system according to an embodiment of the disclosure.

Referring to FIG. 1, the disclosure provides an audio visualization system 100. The system 100 is applied to an electronic device 10. The electronic device 10 has a function of a silent mode, that is, is switchable to a silent mode for operation.

As shown in the figure, the audio visualization system 100 includes a screen 120, a processing unit 130, an audio conversion unit 140, an audio analysis unit 150, and an icon generation unit 160.

The processing unit 130 is configured to execute an audio/video program such as a game program AP, and generate a game picture X1 and an audio effect signal S1 when the game program AP is executed.

In an embodiment, the processing unit 130 is a central processing unit (CPU) or a graphics processing unit (GPU).

The audio conversion unit 140 is configured to receive the audio effect signal S1 and convert the audio effect signal S1 into a two-channel signal S2 and a multi-channel signal S3. The two-channel signal S2 is a signal with two channels. The multi-channel signal S3 is a signal with more than two channels such as a 5.1-channel signal or a 7.1-channel signal. In a case that the hardware of the electronic device 10 supports only the two-channel signal S2. A speaker 180 in the electronic device 10 is driven by directly using the two-channel signal S2 to generate a sound.

In an embodiment, because the audio effect signal S1 generated by a general audio/video program mostly includes information of two channels, the audio conversion unit 140 first converts the audio effect signal S1 into a two-channel signal S2, and then simulates a multi-channel signal S3 by using the two-channel signal S2. Compared with the two-channel signal S2, the multi-channel signal S3 presents the direction and position of the sound more clearly.

The audio analysis unit 150 is electrically connected to the audio conversion unit 140 to receive the multi-channel signal S3 and generate sound data D1 according to the multi-channel signal S3.

In an embodiment, the audio analysis unit 150 receives the multi-channel signal S3 only when an execution environment of the audio/video program is in a silent mode, only when an operating system of the electronic device in which the system 100 is located is switched to the silent mode or a speaker volume of the electronic device in which the system 100 is located is reduced to zero, and sound data D1 is generated according to the multi-channel signal S3.

In an embodiment, the audio conversion unit 140 and the audio analysis unit 150 are located in a digital signal processor (DSP).

A procedure of generating the sound data D1 is described below by using an example. First, sound features f1 and f2 are provided to the audio analysis unit 150 for comparison. The sound features f1 and f2 are extracted in advance from sound samples (for example, the sound of gunshots, the sound of footsteps, the sound of explosions, and the sound of door opening) that need to be visually presented.

The audio analysis unit 150 filters the multi-channel signal S3 by using the sound features f1 and f2, to obtain a sound part that needs to be visually presented. Next, the audio analysis unit 150 performs analysis processing such as positioning on the sound part obtained through filtering to obtain data of various sound, and the data is referred to as the sound data D1 in the disclosure.

In an embodiment, when sound features f1 and f2 that respectively correspond to the sound of footsteps and the sound of gunshots are provided to the audio analysis unit 150 in advance, after filtering the multi-channel signal S3 by using the sound features f1 and f2, the audio analysis unit 150 determines whether there are the sound of footsteps and/or the sound of gunshots in the multi-channel signal S3 or not. In this case, sound data obtained through filtering is used for parsing out orientations, distances, and volumes of the sound of footsteps and/or the sound of gunshots.

In an embodiment, the sound data D1 includes audio source type data, audio source orientation data, audio source distance data, and audio source volume data. The audio source type data represents the type of an audio source. The audio source orientation data represents the orientation of the audio source relative to the position of a game role. The audio source distance data represents a distance of the audio source relative to the position of the game role. The audio source volume data represents a volume received at the position of the game role.

However, the disclosure is not limited thereto. In another embodiment, the sound data D1 only includes the audio source type data and the audio source orientation data. In another embodiment, the sound data D1 only includes at least one of a group including the audio source type data, the audio source orientation data, the audio source distance data, or the audio source volume data.

After receiving the sound data D1 from the audio analysis unit 150, the icon generation unit 160 generates an icon Y1 according to the sound data D1 and presents the icon Y1 on the screen 120. The icon generation unit 160 is a software program.

It should be noted that in this embodiment, instead of using the two-channel signal S2, the audio analysis unit 150 captures the multi-channel signal S3 generated by the audio conversion unit 140 and performs conversion to generate the sound data D1. Therefore, the sound data D1 more accurately presents information such as the audio source orientation, the audio source distance, and the audio source volume, to improve the accuracy of the icon Y1.

Figure 2:
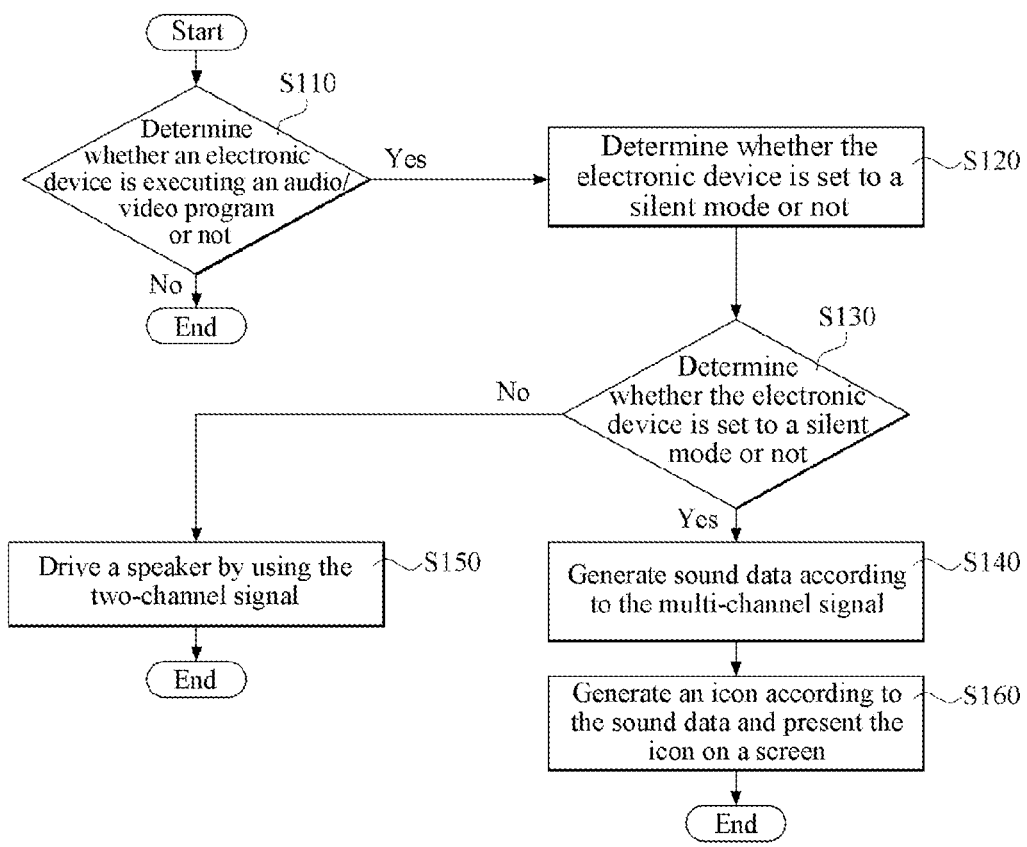
FIG. 2 is a flowchart of an audio visualization method according to an embodiment of the disclosure.

Referring to FIG. 2, the disclosure also provides an audio visualization method. This method is applied to an electronic device. The electronic device is switched to a silent mode. The electronic device includes an audio visualization system 100 shown in FIG. 1. The audio visualization method includes the following steps.

As shown in step S110, it is determined whether an electronic device executes an audio/video program or not. When the audio/video program is executed, an audio effect signal is generated. When the electronic device executes the audio/video program, the process proceeds to step S120. When the electronic device doesn't execute the audio/video program, the process ends. In an embodiment, in step S110, determination is only performed on a program executed in the foreground of the electronic device, while a program executed in the background are ignored.

When the electronic device executes the audio/video program, as shown in step S120, an audio effect signal is converted into a two-channel signal and a multi-channel signal.

In an embodiment, the audio effect signal is first converted into a two-channel signal, and a multi-channel signal is then simulated by using the two-channel signal, to provide more accurate sound data. The foregoing step S110 and step S120 are performed by the audio conversion unit 140 in FIG. 1.

Then, as shown in step S130, it is determined whether the electronic device is set to a silent mode or not. When the electronic device is set to the silent mode, the process proceeds to step S140. When the electronic device isn't set to the silent mode, the process proceeds to step S150: drive a speaker by using the two-channel signal.

When an execution environment of the audio/video program is in a silent mode, as shown in step S140, sound data is generated according to the multi-channel signal.

Then, in step S160, an icon is generated according to the sound data and is presented on a screen.

Figure 3:
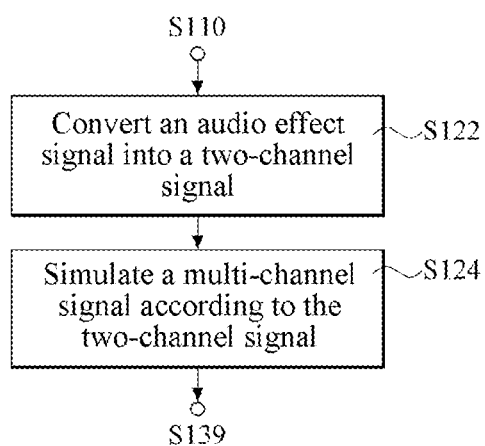
FIG. 3 is a flowchart of an embodiment of step S120 in FIG. 2.

FIG. 3 is a flowchart of an embodiment of step S120 in FIG. 2. This embodiment is applied to a case in which the audio effect signal of the audio/video program has only two channels or a case in which the electronic device has only a two-channel output.

Following step S110, when the electronic device executes the audio/video program, as described in step S122, an audio effect signal is converted into a two-channel signal. Then, as described in step S124, a multi-channel signal is simulated according to the two-channel signal.

In an embodiment, in step S124, a multi-channel signal is simulated according to the two-channel signal by using software or hardware. The multi-channel signal is a 5.1-channel signal or a 7.1-channel signal. The foregoing step S122 and step S124 are performed by the audio conversion unit 140 in FIG. 1.

Figure 4:
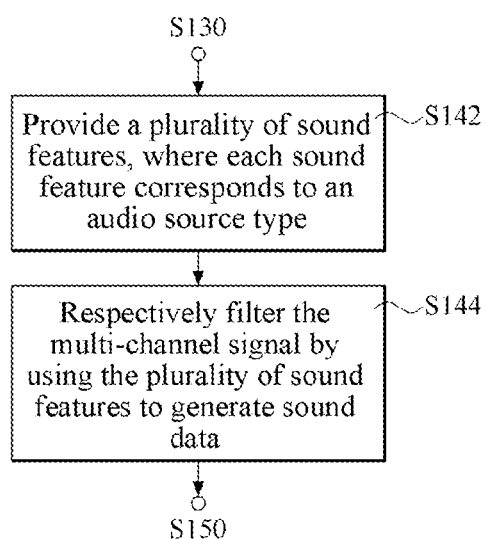
FIG. 4 is a flowchart of an embodiment of step S140 in FIG. 2.

FIG. 4 is a flowchart of an embodiment of step S140 in FIG. 2.

Following step S130, when an execution environment of the audio/video program is in a silent mode, as described in step S142, a plurality of sound features is provided, and each sound feature corresponds to an audio source type.

Then, as described in step S144, the multi-channel signal is respectively filtered by using the plurality of sound features to generate sound data.

The sound data obtained through parsing in step S144 corresponds to a single audio source, a plurality of audio sources of the same type but at different positions, a plurality of audio sources of different types and at different positions, or corresponds to an audio source in which anything that needs to be noted is not found in the sound data. In a case that the audio source in which anything that needs to be noted is not found in the sound data, no icon is generated to prompt a user.

The foregoing step S142 and step S144 are performed by the audio analysis unit 150 in FIG. 1.

Figure 5:
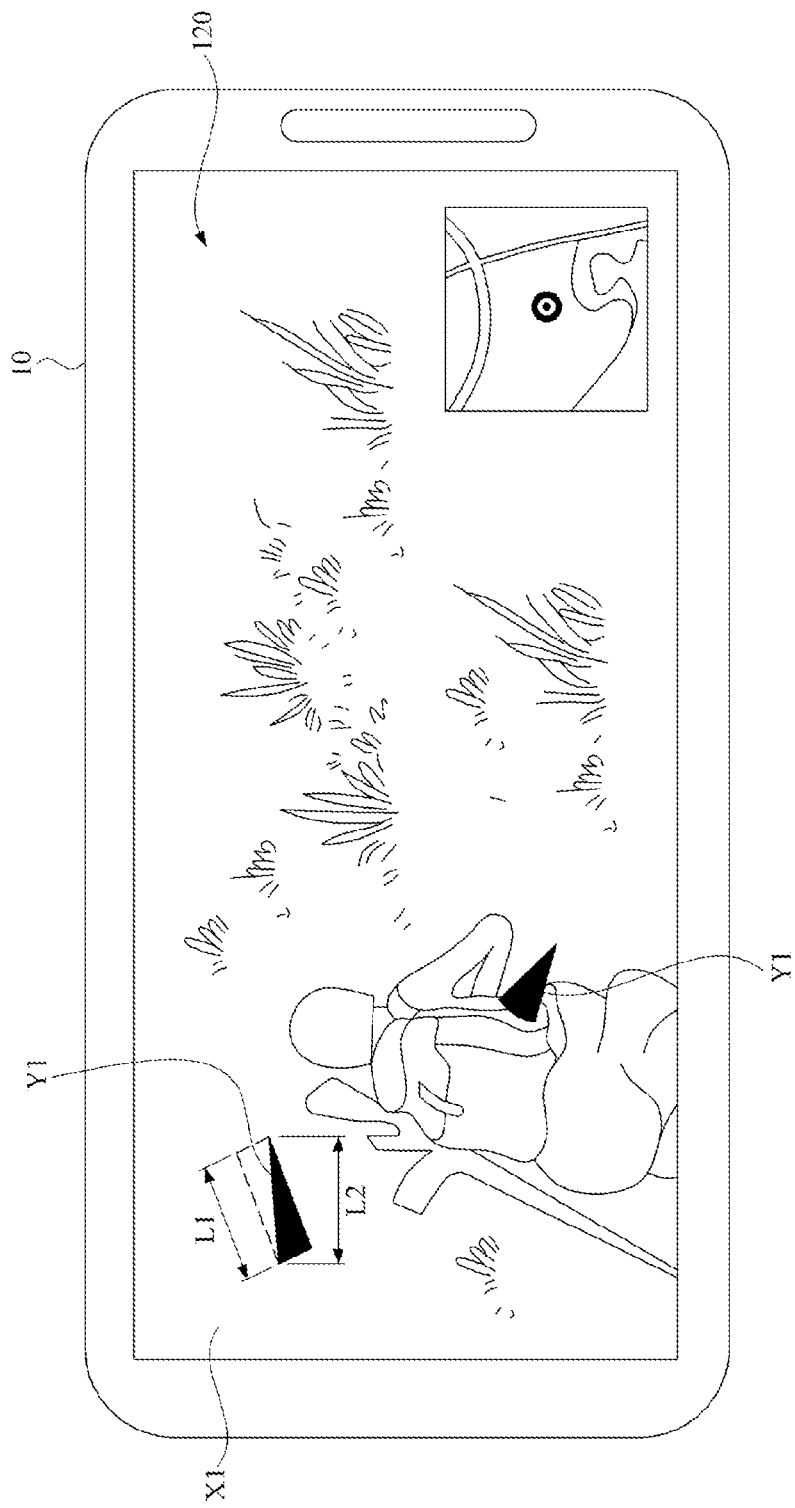
FIG. 5 is a schematic diagram of an icon according to an embodiment of the disclosure.

FIG. 5 is a schematic diagram of an icon according to an embodiment of the disclosure.

As shown in the figure, the icon Y1 is displayed on the game picture X1 in a floating manner, and is presented on the screen 120 as an upper layer image of the game picture X1. The figure shows two icons Y1, representing two different audio sources.

The orientation and dimension of the icon Y1 are used for presenting data such as an audio source orientation, an audio source volume, and an audio source distance. In an embodiment, the user sets the style, color, degree of perspective, and the like of the icon Y1. The position, orientation, dimension, and the like of the icon Y1 are correspondingly changed according to data such as an audio source orientation, an audio source volume, and an audio source distance.

In an embodiment, as shown in the figure, the icon Y1 is an arrow. The position or orientation of the arrow corresponds to the audio source orientation data. In an embodiment, when the arrow is located on a right side of a picture or a right side of a game role, or the arrow points to a right side, it indicates that the audio source is located on the right side. Conversely, when the arrow is located on a left side of the picture or a left side of the game role, or the arrow points to a left side, it indicates that the audio source is located on the left side.

In an embodiment, the icon Y1 has a first dimension L1 and a second dimension L2 that respectively correspond to the audio source distance data and the audio source volume data. The arrow in the figure is used as an example. The first dimension L1 is the length of the arrow, and the second dimension L2 is the size of the arrow. In addition to the arrow, other patterns with a pointing function such as a triangle are applied to the disclosure as the icon Y1.

In addition, the arrow in this embodiment is displayed on the game picture X1 in a floating manner matching a game scene. In an embodiment, when a game presents a three-dimensional scene, a three-dimensional arrow is presented matching the three-dimensional scene, to accurately point out an audio source orientation.

Further, in this embodiment, the arrows present the audio source orientation data, the audio source volume data, and the audio source distance data in the sound data D1. The audio source type data is presented by using a text, a symbol, or a pattern. The word, symbol, or pattern is presented near the arrow. However, the disclosure is not limited thereto. In another embodiment, a plurality of different patterns is directly used as the icon Y1, representing different audio source types. In an embodiment, a footprint pattern represents the sound of footsteps, a water flow pattern represents the sound of water, and a gunshot pattern represents the sound of gunshots. The orientation and dimension of each icon Y1 are used for presenting data such as an audio source orientation, an audio source volume, and an audio source distance.

Through the audio visualization method and system 100 thereof provided in the disclosure, in a silent mode, an audio effect signal S1 is generated when an audio/video program is executed is converted into a multi-channel signal S3, and an icon Y1 is then generated by using the multi-channel signal and is presented on a screen, to provide a user with visual guidance to help the user operate.

The above is merely exemplary embodiments of the disclosure, and does not constitute any limitation on the disclosure. Any form of equivalent replacements or modifications to the technical means and technical content disclosed in the disclosure made by a person skilled in the art without departing from the scope of the technical means of the disclosure still fall within the content of the technical means of the disclosure and the protection scope of the disclosure.

What is claimed is:

1. An audio visualization method, applied to an electronic device with a screen and a function of a silent mode, the audio visualization method comprising:
   determining whether the electronic device executes an audio/video program or not, wherein when the audio/video program is executed, an audio effect signal is generated;
   converting the audio effect signal into a two-channel signal and a multi-channel signal when the electronic device executes the audio/video program, wherein a channel count of the two-channel signal is less than that of the multi-channel signal;
   generating sound data according to the multi-channel signal when the electronic device is set to the silent mode; and
   generating an icon according to the sound data and presenting the icon on the screen.

2. The audio visualization method according to claim 1, wherein the step of generating the icon according to the sound data and presenting the icon on the screen comprises rendering the icon on a scene picture of the audio/video program.

3. The audio visualization method according to claim 1, wherein the multi-channel signal is a 5.1-channel signal or a 7.1-channel signal.

4. The audio visualization method according to claim 1, wherein the sound data comprises audio source type data, audio source orientation data, audio source distance data, and audio source volume data.

5. The audio visualization method according to claim 4, wherein the icon has a first dimension and a second dimension, the first dimension corresponds to the audio source distance data, and the second dimension corresponds to the audio source volume data.

6. The audio visualization method according to claim 5, wherein the first dimension is a length of the icon, and the second dimension is a size of the icon.

7. The audio visualization method according to claim 1, wherein the step of generating the sound data according to the multi-channel signal comprises:
   providing a plurality of sound features, wherein each sound feature corresponds to an audio source type; and
   respectively filtering the multi-channel signal by using the plurality of sound features to generate the sound data.

8. The audio visualization method according to claim 1, wherein the icon is an arrow.

9. The audio visualization method according to claim 1, wherein the step of converting the audio effect signal into a multi-channel signal comprises:
   converting the audio effect signal into the two-channel signal; and
   simulating the multi-channel signal according to the two-channel signal.

10. An audio visualization system, applied to an electronic device with a function of a silent mode, the system comprising:
   a screen;
   a processing unit, configured to execute an audio/video program, wherein when the audio/video program is executed, an audio effect signal is generated;
   an audio conversion unit, configured to receive the audio effect signal and convert the audio effect signal into a two-channel signal and a multi-channel signal;
   an audio analysis unit, configured to, when the electronic device is set to the silent mode, receive the multi-channel signal and generate sound data according to the multi-channel signal; and an icon generation unit, configured to generate an icon according to the sound data and present the icon on the screen.

* * * * *